(12) United States Patent
Park et al.

(10) Patent No.: US 10,845,819 B2
(45) Date of Patent: Nov. 24, 2020

(54) CLEANER AND CONTROL METHOD THEREOF

(71) Applicant: LG ELECTRONICS INC., Seoul (KR)

(72) Inventors: Sangyeol Park, Seoul (KR); Sunghun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 289 days.

(21) Appl. No.: 15/892,007

(22) Filed: Feb. 8, 2018

(65) Prior Publication Data
US 2019/0025850 A1   Jan. 24, 2019

(30) Foreign Application Priority Data
Jul. 21, 2017   (KR) .......................... 10-2017-0092901

(51) Int. Cl.
*G05D 1/02* (2020.01)
*A47L 9/28* (2006.01)
(Continued)

(52) U.S. Cl.
CPC ............ *G05D 1/0253* (2013.01); *A47L 9/009* (2013.01); *A47L 9/2805* (2013.01); *A47L 9/2852* (2013.01); *A47L 9/30* (2013.01); *G05D 1/0246* (2013.01); *G06K 9/00664* (2013.01); *G06K 9/00805* (2013.01); *G06K 9/2027* (2013.01); *G06K 9/6268* (2013.01); *H04N 5/2253* (2013.01); *H04N 5/2257* (2013.01);
(Continued)

(58) Field of Classification Search
CPC ...... A47L 2201/04; A47L 9/30; A47L 9/2826; A47L 9/2852; A47L 11/00; A47L 11/24; A47L 11/33; A47L 11/4061; A47L 11/4066
See application file for complete search history.

(56) References Cited

U.S. PATENT DOCUMENTS 10,136,787 B2 * 11/2018 Wang ..................... A47L 11/24
2012/0200708 A1 * 8/2012 Fukuda .................... B60R 1/00
348/148

(Continued)

FOREIGN PATENT DOCUMENTS

JP    2017-090416    5/2017
KR    10-0185909    5/1999
(Continued)

OTHER PUBLICATIONS

Korean Notice of Allowance dated Feb. 28, 2019 issued in Application No. 10-2017-0092901.
(Continued)

*Primary Examiner* — Redhwan K Mawari
(74) *Attorney, Agent, or Firm* — Ked & Associates, LLP

(57) ABSTRACT

A cleaner performing autonomous traveling includes a main body, a driving unit moving the main body, a camera capturing an image around the main body at every preset period, and a controller selecting at least one of a plurality of traveling modes and controlling the driving unit and the camera to perform the selected traveling mode, wherein the controller changes a set value related to illumination of the camera while the camera is continuously capturing images.

20 Claims, 12 Drawing Sheets

(51) Int. Cl.
*A47L 9/30* (2006.01)
*H04N 5/225* (2006.01)
*G06K 9/00* (2006.01)
*A47L 9/00* (2006.01)
*G06K 9/20* (2006.01)
*G06K 9/62* (2006.01)

(52) U.S. Cl.
CPC ....... *A47L 2201/00* (2013.01); *A47L 2201/04* (2013.01); *G05D 2201/0203* (2013.01); *G05D 2201/0215* (2013.01)

(56) References Cited

U.S. PATENT DOCUMENTS

| | | | | |
|---|---|---|---|---|
| 2016/0022107 | A1* | 1/2016 | Kim | G05D 1/0094 700/253 |
| 2016/0037067 | A1* | 2/2016 | Lee | H04N 5/23232 348/208.6 |
| 2016/0059420 | A1* | 3/2016 | Ji | B25J 5/00 348/148 |
| 2016/0098039 | A1* | 4/2016 | Noh | A47L 9/30 701/28 |
| 2017/0140540 | A1* | 5/2017 | Yamamoto | G05D 1/0251 |
| 2017/0332871 | A1* | 11/2017 | Sung | G05D 1/024 |
| 2018/0011490 | A1* | 1/2018 | You | G01S 7/4814 |
| 2019/0025850 | A1* | 1/2019 | Park | H04N 5/2257 |

FOREIGN PATENT DOCUMENTS

| | | |
|---|---|---|
| KR | 10-2004-00805 85 | 9/2004 |
| KR | 10-2013-0042389 | 4/2013 |
| KR | 101540666 | 7/2015 |
| KR | 10-1571719 | 11/2015 |
| KR | 10-2016-0090278 | 7/2016 |
| KR | 10-2017-0047381 | 5/2017 |
| TW | 2016-42180 | 12/2016 |
| TW | M541824 | 5/2017 |

OTHER PUBLICATIONS

Taiwanese Office Action dated Mar. 18, 2019 issued in Application No. 107109703 (English translation attached).
Korean Office Action dated Dec. 19, 2018 issued in KR Application No. 10-2017-0092901.
International Search Report dated Apr. 20, 2018 issued in Application No. PCT/KR2017/009045.

* cited by examiner

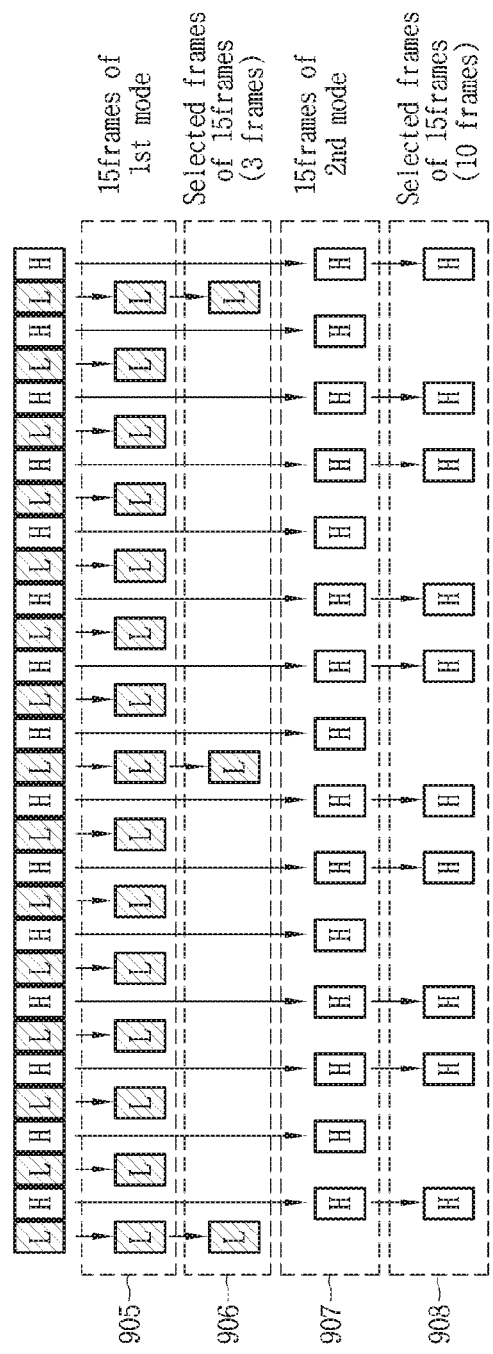

CLEANER AND CONTROL METHOD THEREOF

CROSS-REFERENCE TO RELATED APPLICATION

This application claims priority under 35 U.S.C. § 119 to Korean Application No. 10-2017-0092901, filed on Jul. 21, 2017, whose entire disclosure is hereby incorporated by reference.

BACKGROUND

1. Field

The present disclosure relates to a cleaner and a control method thereof, and particularly, to a cleaner which recognizes an obstacle and performs autonomous traveling, and a control method thereof.

2. Background

In general, a robot has been developed for an industrial purpose and has been in charge of part of factory automation. Recently, robot-applied fields have further extended to develop medical robots or aerospace robots, and home robots that may be used in general houses have also been made.

A typical example of home robots is a robot cleaner, which is a sort of a home appliance for performing cleaning by sucking ambient dust or foreign objects, while traveling in a predetermined area. Such a robot cleaner includes a generally rechargeable battery and has an obstacle sensor capable of avoiding an obstacle during traveling so that the robot cleaner may perform cleaning, while traveling.

Recently, beyond performing cleaning while robot cleaners are simply autonomously traveling in a cleaning area, research into utilization of robot cleaners in various fields such as healthcare, smart home, remote control, and the like, has been actively conducted.

In general, a robot cleaner uses an image obtained by a ceiling camera which is oriented to an upper side of a main body during simultaneous localization and mapping (SLAM) traveling to create a cleaning map. Also, in general, the robot cleaner uses an image obtained by a front camera which is oriented to a front side of the main body during monitoring traveling to transmit information regarding surroundings of the main body.

Here, a controller of the robot cleaner may set certain fixed or set values of the ceiling camera and the front camera to be different. For example, the controller may set a set value of the ceiling camera used for simultaneous localization and mapping (SLAM) to capture an image of relatively low intensity of illumination. In another example, the controller may control a set value of the front camera used for monitoring to capture an image of relatively high intensity of illumination. That is, although the front camera has the same performance as that of the ceiling camera, the controller may set the set values of the cameras to be different according to purposes.

However, when a fixed set value of a camera is used, cameras corresponding to the number of traveling modes performed by the robot cleaner should be provided to normally perform the plurality of traveling modes. That is, since a general robot cleaner should be provided with a plurality of cameras respectively corresponding to the plurality of traveling modes, manufacturing cost is increased.

Meanwhile, recently, the necessity of a robot cleaner capable of performing various functions using only a single camera has emerged. In the case of using only a single camera, if an image is obtained in a state in which a set value of the camera is fixed, various images required for a plurality of traveling modes cannot be obtained.

In this connection, Korean Patent Registration No. 10-0185909 (publication date: May 1, 1999) discloses a configuration in which an exposure control signal is generated on the basis of a weight value set to be different for an imaged scene within a window and an imaged scene outside the window. However, an apparatus for controlling exposure of a video camera according to Korean Patent Registration No. 10-0185909 merely provides an iris to provide accurate brightness on the basis of a position of a subject within an imaged scene and has difficulty in obtaining an image having a required set value according to a function performed by a robot cleaner.

The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements, and wherein:

FIGS. 9A to 9C are conceptual views illustrating a method for processing a plurality of frames obtained from a single camera of a cleaner according to an embodiment of the present disclosure.

DETAILED DESCRIPTION

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1:
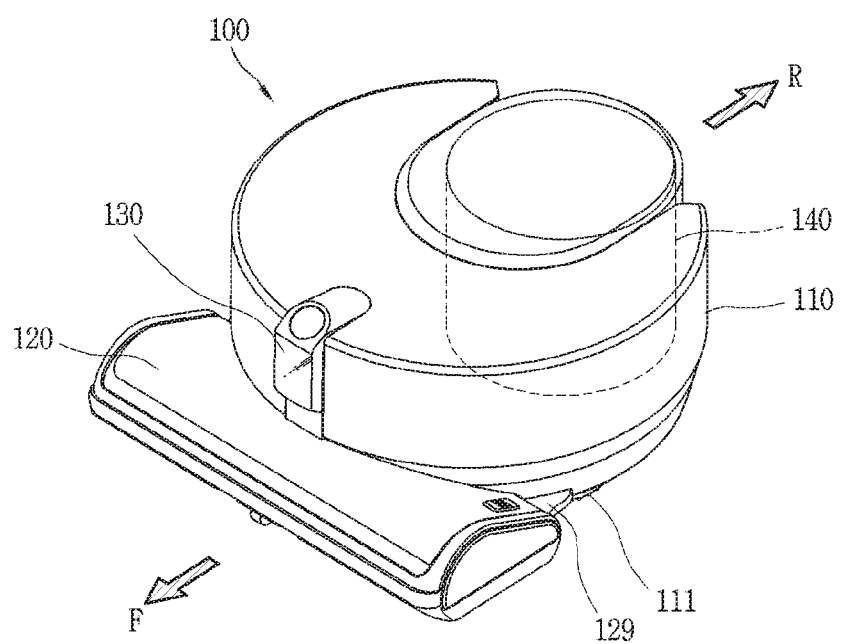
FIG. 1 is a perspective view illustrating an example of a cleaner performing autonomous traveling according to an embodiment of the present disclosure.
Figure 2:
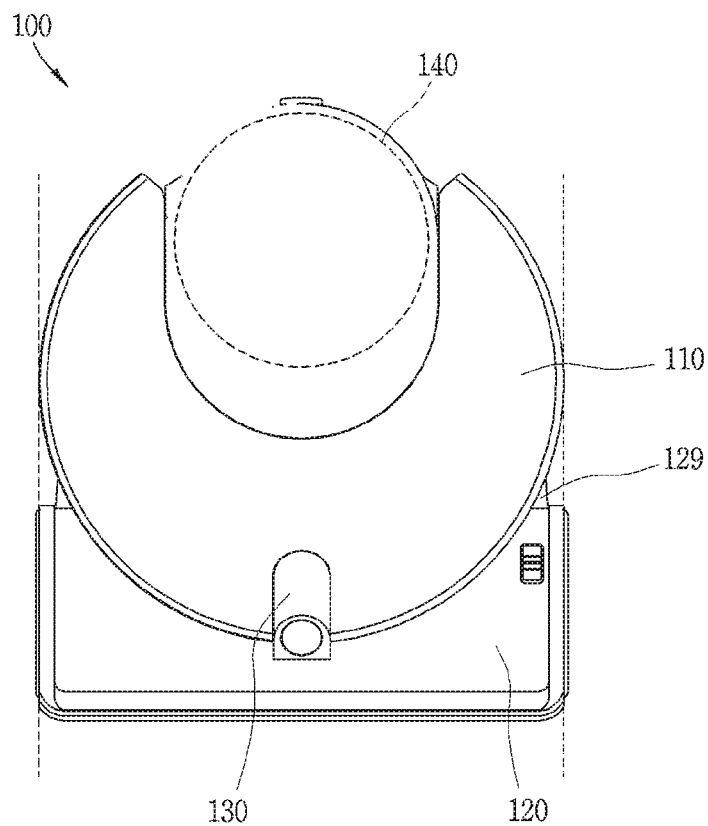
FIG. 2 is a plan view of the cleaner performing autonomous traveling illustrated in FIG. 1.
Figure 3:
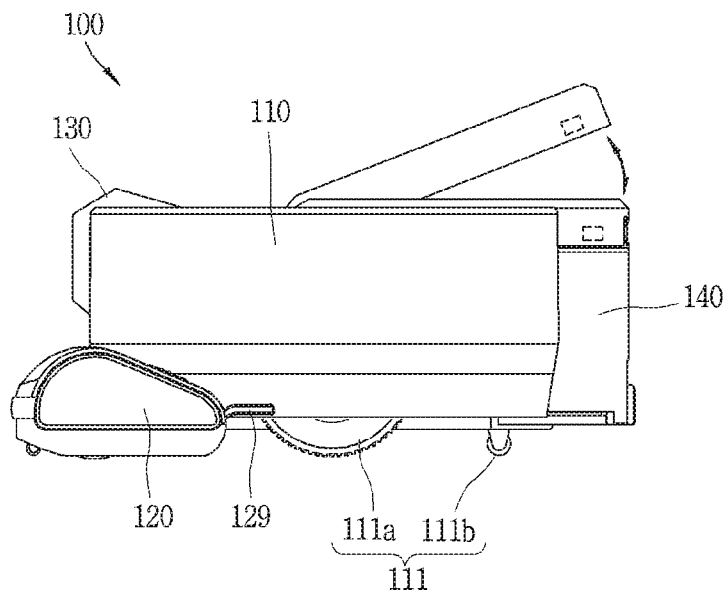
FIG. 3 is a side view of the cleaner performing autonomous traveling illustrated in FIG. 1.

FIG. 1 is a perspective view illustrating an example of a robot cleaner 100 according to the present disclosure, FIG. 2 is a plan view of the robot cleaner 100 illustrated in FIG. 1, and FIG. 3 is a side view of the robot cleaner 100 illustrated in FIG. 1. For reference, in this disclosure, a moving robot, a robot cleaner, and a cleaner performing autonomous traveling (e.g., an autonomous cleaner) may be used to have the same meaning.

Referring to FIGS. 1 to 3, the robot cleaner 100 performs a function of cleaning a floor, while traveling a predetermined area by itself. Here, cleaning the floor includes sucking dust (including a foreign object) of the floor and wiping the floor. The robot cleaner 100 includes a cleaner body 110, a suction unit (or suction head) 120, a sensing unit (also referred to herein as a camera or an image sensor) 130, and a dust box (also referred to as a dust container or dust bin) 140.

A controller (not shown) for controlling the robot cleaner 100 and a wheel unit 111 for causing the robot cleaner 100 to travel are provided in the cleaner body 110. The robot cleaner 100 may be moved or rotated in every direction by the wheel unit 111. The wheel unit 111 includes a main wheel 111a and a sub-wheel 111b.

The main wheel 111a is provided on both sides of the cleaner body 110 and is rotatable in one direction or in the other direction according to a control signal from the controller. Each main wheel 111a may be configured to be driven mutually independently. For example, each main wheel 111a may be driven by different motors.

The sub-wheel 111b supports the cleaner body 110 with the main wheel 111a and assists traveling of the robot cleaner 100 by the main wheel 111a. The sub-wheel 111b may also be provided in the suction unit 120 described hereinafter. As described above, as the controller controls driving of the wheel unit 111, the robot cleaner 100 may autonomously travel on the floor.

Meanwhile, a battery (not shown) supplying power to the robot cleaner 100 is installed in the cleaner body 110. The battery may be rechargeable and may be detachably provided on a bottom surface part of the cleaner body 110.

The suction unit 120 is provided to protrude from one side of the cleaner body 110 and suck air including dust. The one side may be a side in which the cleaner body 110 travels in a forward direction (F), i.e., a front side of the cleaner body 110.

In the drawing, it is illustrated that the suction unit 120 protrudes from one side of the cleaner body 110 to the front side and to the left and right sides. In detail, a front end portion of the suction unit 120 is provided in a position spaced apart from one side of the cleaner body 110 forwardly, and left and right end portions of the suction unit 120 are provided in positions spaced apart from one side of the cleaner body 110 leftwardly and rightwardly.

As the cleaner body 110 has a circular shape and both sides of a rear end portion of the suction unit 120 protrude to both left and right sides of the cleaner body 110, an empty space, i.e., a gap, may be formed between the cleaner body 110 and the suction unit 120. The empty space may be a space between left and right end portions of the cleaner body 110 and left and right end portions of the suction unit 120, and has a shape recessed to an inner side of the robot cleaner 100.

In case where an obstacle is caught in the empty space, the robot cleaner 100 may be caught by the obstacle and cannot move. In order to prevent this, the cover member 129 may be provided to cover at least a portion of the empty space. The cover member 129 may be provided in the cleaner body 110 or the suction unit 120. In this embodiment, the cover member 129 protrudes from both sides of a rear end portion of the suction unit 120 and covers an outer circumferential surface of the cleaner body 110.

The cover member 129 is provided to fill the empty space, i.e., at least a portion of the empty space between the cleaner body 110 and the suction unit 120. Thus, an obstacle is prevented from being caught in the empty space, or although an obstacle is caught in the empty space, the robot cleaner may be easily released from the obstacle.

The cover member 129 protruding from the suction unit 120 may be supported by an outer circumferential surface of the cleaner body 110. When the cover member 129 protrudes from the cleaner body 110, the cover member 129 may be supported by a rear surface portion of the suction unit 120. According to the structure, when the suction unit 120 collides with an obstacle, a partial amount of the impact may be transmitted to the cleaner body 110 such that the impact is distributed.

The suction unit 120 may be detachably coupled to the cleaner body 110. When the suction unit 120 is separated from the cleaner body 110, a cloth module (not shown) may be detachably coupled to the cleaner body 110. Thus, when the user wants to remove dust from a floor, the user may attach the suction unit 120 to the cleaner body 110, and when the user wants to wipe the floor, the user may attach the cloth module to the cleaner body 110.

When the suction unit 120 is mounted in the cleaner body 110, mounting of the suction unit 120 may be guided by the aforementioned cover member 129. That is, since the cover member 129 is provided to cover an outer circumferential surface of the cleaner body 110, a relative position of the suction unit 120 with respect to the cleaner body 110 may be determined.

The sensing unit 130 is provided in the cleaner body 110. As illustrated, the sensing unit 130 may be provided on one side of the cleaner body 110 where the suction unit 120 is positioned, i.e., on the front side of the cleaner body 110.

The sensing unit 130 may be provided to overlap the suction unit 120 in a vertical direction of the cleaner body 110. The sensing unit 130 may be provided above the suction unit 120 to sense an obstacle, a geographic feature, and the like, in front of the robot cleaner 100 such that the suction unit 120 positioned on the forefront may not collide with the obstacle.

The sensing unit 130 is configured to additionally perform another sensing function in addition to such sensing (or detection) function. This will be described in detail hereinafter.

A dust box accommodation part is provided in the cleaner body 110, and a dust box 140 separately collecting dust in sucked air is detachably coupled to the dust box accommodation part. As illustrated, the dust box accommodation part may be provided on the other side of the cleaner body 110, i.e., on the rear of the cleaner body 110.

A portion of the dust box 140 may be accommodated in the dust box accommodation part while another portion of the dust box 140 may protrude toward a rear side (i.e., in a reverse direction (R) opposite to a forward direction (F)) of the cleaner body 110.

An inlet, to which air including dust is introduced, and an outlet, from which air separated from dust is discharged, are provided in the dust box 140. When the dust box 140 is installed in the dust box accommodation part, the inlet and the outlet communicate with a first opening and a second opening provided on an inner side wall of the dust box accommodation part. An intake flow channel within the cleaner body 110 corresponds to a flow channel from an inlet (not shown) communicating with a communication part to the first opening, and an exhaust flow channel corresponds to a flow channel from the second opening to an exhaust.

According to the connection relationship, air including dust introduced through the suction unit 120 is introduced to the dust box 140 through the intake flow channel within the cleaner body 110 and air and dust are separated from each other through a filter or cyclone of the dust box 140. Dust is collected by the dust box 140 and air is discharged from the dust box 140, passes through an exhaust flow channel within the cleaner body 110, and is finally discharged to the outside through the exhaust.

Figure 4:
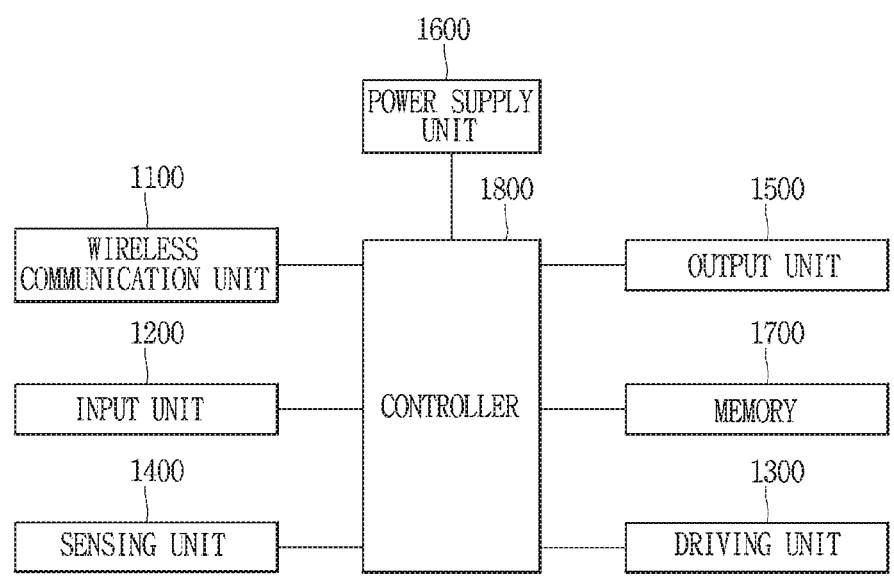
FIG. 4 is a block diagram illustrating components of a cleaner performing autonomous traveling according to an embodiment of the present disclosure.

Hereinafter, an embodiment related to components of the robot cleaner 100 will be described with reference to FIG. 4. The robot cleaner 100 or the moving robot according to an embodiment of the present disclosure may include at least one of a communication unit (also referred to herein has a wireless communication unit or a communication interface) 1100, an input unit 1200 (or input device), a driving unit (or motor) 1300, a sensing unit (or sensor) 1400, an output unit (also referred to as a display providing visual output or a speaker providing audio) 1500, a power supply unit (or power supply) 1600, a memory 1700, and a controller (also referred to as a control processor or a control circuit) 1800, and any combination thereof. Here, the components illustrated in FIG. 4 are not essential and a robot cleaner including greater or fewer components may be implemented. Hereinafter, the components will be described.

First, the power supply unit 1600 includes a battery that may be charged by external commercial power and supplies power to the inside of the moving robot. The power supply unit 1600 may supply driving power to each of the components included in the moving robot to provide operation power required for the moving robot to travel (or move or run) or perform a specific function.

Here, the controller 1800 may detect a remaining capacity of power of the battery, and when the remaining capacity of power is insufficient, the controller 1800 controls the moving robot to move to a charging station connected to an external commercial power so that the battery may be charged upon receiving a charge current from the charging station. The battery may be connected to a battery sensing unit and a remaining battery capacity and a charging state thereof may be transmitted to the controller 1800. The output unit 1500 may display a remaining battery capacity on a screen by the controller 1800.

The battery may be positioned on a lower side of the center of the robot cleaner or may be positioned on one of left and right sides. In the latter case, the moving robot may further include a balance weight (or a counter weight) in order to resolve weight unbalance of the battery.

The controller 1800, serving to process information on the basis of an artificial intelligent technology, includes at least one module performing at least one of learning of information, inference of information, perception of information, and processing of a natural language. The controller 1800 may perform at least one of learning, inferring, and processing a huge amount of information (bit data) such as information stored in the cleaner, environment information around a mobile terminal, and information stored in a communication-available external repository, using a machine learning technology. Also, the controller 1800 may predict (or infer) at least one executable operation of the cleaner using information learned using the machine learning technology, and control the cleaner to execute an operation with highest realization among the at least one predicted operation.

The machine learning technology is a technology of collecting and learning large-scale information no the basis of at least one algorithm, and determining and predicting information on the basis of learned information. Learning of information is an operation of recognizing features, rules, standard for determining, and the like, of information, quantizing a relationship between information and information, and predicting new data using a quantized pattern.

An algorithm used by the machine learning technology may be an algorithm based on statistics and may be, for example, a decision tree using a tree structure form as a prediction model, a neural network imitating a neural network structure and function of living things, generic programming based on an evaluation algorithm of living things, clustering distributing an observed example to sub-sets called communities, a Monte Carlo method calculating a function value as a probability through a randomly extracted random number, and the like.

A deep learning technology, a field of the machine learning technology, is a technology of performing at least one of learning, determining, and processing information using a deep neuron network (DNN) algorithm. The DNN may have a structure of connecting layers and transmitting data between layers. Such a deep learning technology may allow for leaning a huge amount of information through the DNN using a graphic processing unit (GPU) optimized for parallel arithmetic.

The controller 1800 may be equipped with a learning engine which uses training data stored in an external server or memory and detects features for recognizing a predetermined object. Here, the features for recognizing an object may include a size, a shape, shade, and the like, of the object.

In detail, when a portion of an image obtained through a camera provided in the cleaner is input to the learning engine, the controller 1800 may recognize at least one object or a living thing included in the input image. In this manner, when the learning is applied to traveling of the cleaner, the controller 1800 may recognize whether an obstacle such as legs of a chair, a fan, or a balcony of a specific form which obstructs traveling of the cleaner, increasing efficiency and reliability of traveling of the cleaner.

Meanwhile, the aforementioned learning engine may be installed in the controller 1800 or may be installed in an external server. When the learning engine is installed in an external server, the controller 1800 may control the communication unit 1100 to transmit at least one image as an analysis target to the external server.

By inputting an image received from the cleaner to the learning engine, the external server may recognize at least one object or a living thing included in the corresponding image. Also, the external server may transmit information related to a recognition result to the cleaner. Here, the information related to the recognition result may include information related to the number of objects included in the image as an analysis target and the name of each object.

Meanwhile, the driving unit 1300 may include a motor and drive the motor to rotate left and right main wheels of the main body of the moving robot in both directions to rotate or move the main body. The driving unit 1300 may move the main body of the moving robot forwards/backwards and leftwards/rightwards, or enable the main body of the moving robot to travel in a curved manner or rotate in place.

Meanwhile, the input unit 1200 receives various control commands regarding the robot cleaner from a user. The input unit 1200 may include one or more buttons, for example, an OK button, a setting button, and the like. The OK button is a button for receiving a command for checking detection information, obstacle information, position information, and map information from the user, and the setting button may be a button for receiving a command for setting the aforementioned types of information from the user.

Also, the input unit 1200 may include an input resetting button for canceling a previous user input and receiving a user input again, a delete button for deleting a preset user input, a button for setting or changing an operation mode, or a button for receiving a command for returning to the charging station.

Also, the input unit 1200 may be installed in an upper portion of the moving robot, as a hard key, a soft key, or a touch pad. Also, the input unit 1200 may have a form of a touch screen together with the output unit 1500.

Meanwhile, the output unit 1500 may be installed in an upper portion of the moving robot. An installation position or an installation form thereof may be varied. For example, the output unit 1500 may display a battery state or a traveling scheme.

Also, the output unit 1500 may output information regarding a state of an interior of the moving robot detected by the sensing unit 1400, for example, a current state of each component included in the moving robot. Also, the output unit 1500 may display external state information, obstacle information, position information, and map information detected by the sensing unit 1400 on a screen. The output unit 1500 may be configured as at least one device among a light emitting diode (LED), a liquid crystal display (LCD), a plasma display panel (PDP), an organic light emitting diode (OLED).

The output unit 1500 may further include a sound output unit audibly outputting an operational process or an operation result of the moving robot performed by the controller 1800. For example, the output unit 1500 may output a warning sound outwardly according to a warning signal generated by the controller 1800.

Here, the sound output unit may be a unit for outputting a sound, such as a beeper, a speaker, and the like, and the output unit 1500 may output audio data or message data having a predetermined pattern stored in the memory 1700 through the sound output unit.

Thus, the moving robot according to an embodiment of the present disclosure may output environment information regarding a traveling region on a screen or output it as a sound through the output unit 1500. Also, according to another embodiment, the moving robot may transmit map information or environment information to a terminal device through the communication unit 1100 such that the terminal device may output a screen or a sound to be output through the output unit 1500.

Meanwhile, the communication unit 1100 may be connected to the terminal device and/or a different device positioned within a specific region (which will be used together with a "home appliance" in this disclosure) according to one communication scheme among wired, wireless, and satellite communication schemes to transmit and receive data.

The communication unit 1100 may transmit and receive data to and from a different device positioned within a specific region. Here, the different device may be any device as long as it can be connected to a network and transmit and receive data. For example, the different device may be a device such as an air-conditioner, a heating device, an air purifier, a lamp, a TV, an automobile, and the like. Also, the different device may be a sensor sensing a temperature, humidity, atmospheric pressure, a gas, and the like.

Meanwhile, the memory 1700 stores a control program controlling or driving the robot cleaner and data corresponding thereto. The memory 1700 may store audio information, image information, obstacle information, position information, map information, and the like. Also, the memory 1700 may store information related to a traveling pattern.

As the memory 1700, a non-volatile memory is commonly used. Here, the non-volatile memory (NVM) (or NVRAM) is a storage device capable of continuously maintaining stored information even though power is not applied thereto. For example, the memory 1700 may be a ROM, a flash memory, a magnetic computer storage device (for example, a hard disk or a magnetic tape), an optical disk drive, a magnetic RAM, a PRAM, and the like.

Meanwhile, the sensing unit 1400 (which may include or correspond to the sensing unit 130) may include at least one of an external signal sensor, a front sensor, a cliff sensor, a 2D camera sensor, and a 3D camera sensor. The external signal sensor may sense an external signal of the moving robot. The external signal sensor may be, for example, an infrared sensor, an ultrasonic sensor, an RF sensor, and the like.

The moving robot may check a position and a direction of the charging station upon receiving a guide signal generated by the charging station using the external signal sensor. Here, the charging station may transmit the guide signal indicating a direction and a distance such that the moving robot may be returned. That is, upon receiving the signal transmitted from the charging station, the moving robot may determine a current position and set a movement direction to return to the charging station.

Meanwhile, the front sensor may be installed at a predetermined interval on a front side of the moving robot, specifically, along an outer circumferential surface of a side surface of the moving robot. The front sensor may be positioned on at least one side surface of the moving robot to sense an obstacle ahead. The front sensor may sense an object, in particular, an obstacle, present in a movement direction of the moving robot and transfer detection information to the controller 1800. That is, the front sensor may sense a protrusion present in a movement path of the moving robot, furnishings, furniture, a wall surface, a wall corner, and the like, in a house, and transmit corresponding information to the controller 180.

The front sensor may be, for example, an infrared sensor, an ultrasonic sensor, an RF sensor, a geomagnetic sensor, and the like, and the moving robot may use a type of sensor or two or more types of sensors together as the front sensor. For example, in general, the ultrasonic sensor may be mainly used to sense an obstacle in a remote area. The ultrasonic sensor may include a transmission unit and a reception unit. The controller 1800 may determine whether an obstacle is present according to whether an ultrasonic wave radiated through the transmission unit is reflected by an obstacle, or the like, and received by the reception unit, and calculate a distance to the obstacle by using an ultrasonic wave radiation time and an ultrasonic wave reception time.

Also, the controller 1800 may detect information related to a size of an obstacle by comparing an ultrasonic wave radiated from the transmission unit and an ultrasonic wave received by the reception unit. For example, as a larger amount of ultrasonic waves is received by the reception unit, the controller 1800 may determine that the size of the obstacle is larger.

In an embodiment, a plurality of ultrasonic sensors (for example, five ultrasonic sensors) may be installed on an outer circumferential surface of a front side of the moving robot. Here, preferably, the transmission units and the reception units of the ultrasonic sensors may be installed alternately on the front side of the moving robot.

Namely, the transmission units may be provided to be spaced apart from the center of the front side of the main body of the moving robot, and in this case, one or two or more transmission units may be provided between reception units to form a reception region of an ultrasonic signal reflected from the obstacle, or the like. Due to this disposition, a reception region may be expanded, while reducing the number of sensors. A transmission angle of ultrasonic waves may be maintained at an angle of a range which does not affect other signals to prevent a crosstalk phenomenon. Also, reception sensitivity of the reception units may be set to be different.

Also, the ultrasonic sensors may be installed upwardly at a predetermined angle such that ultrasonic waves generated by the ultrasonic sensors are output upwardly, and in this case, in order to prevent the ultrasonic waves from being radiated downwardly, a predetermined blocking member may be further provided.

Meanwhile, as mentioned above, two or more types of sensors may be used as the front sensors, and thus, one or more types of sensor among an infrared sensor, an ultrasonic sensor, and an RF sensor may be used as the front sensors. For example, the front sensor may include an infrared sensor as a different type of sensor, in addition to the ultrasonic sensor.

The infrared sensor may be installed on an outer circumferential surface of the moving robot together with the ultrasonic sensor. The infrared sensor may also sense an obstacle present in front of or by the side of the moving robot and transmit corresponding obstacle information to the controller 1800. That is, the infrared sensor may sense a protrusion present in a movement path of the moving robot, furnishings, furniture, a wall surface, a wall corner, and the like, in a house, and transmit corresponding information to the controller 1800. Thus, the moving robot may move within a cleaning area without colliding with an obstacle.

Meanwhile, as the cliff sensor, various types of optical sensors may be use, and the cliff sensor may sense an obstacle of the floor supporting the main body of the moving robot. That is, the cliff sensor may be installed on a rear surface of the moving robot 100 and may be installed in different regions depending on a type of a moving robot. The cliff sensor may be positioned on a rear surface of the moving robot to sense an obstacle on the floor. The cliff sensor may be an infrared sensor including a light emitting unit and a light receiving unit, an ultrasonic sensor, an RF signal, a position sensitive detector (PSD) sensor, and the like, like the obstacle sensor. For example, any one of cliff sensors may be installed on the front side of the moving robot, and the other two cliff sensors may be installed on a relatively rear side.

For example, the cliff sensor may be a PSD sensor or may include a plurality of different types of sensor. The PSD sensor detects the positions of the short and long distances of an incident light with a single p-n junction by using the surface resistance of a semiconductor. The PSD sensor includes a 1D PSD sensor that detects light on a single axis and a 2D PSD sensor that may detect the position of light on the surface, and they have a pin photodiode structure. The PSD sensor is a type of infrared sensor which transmits an infrared ray to an obstacle and measures an angle between the infrared ray transmitted to the obstacle an infrared ray returned after being reflected from the obstacle, thus measuring a distance therebetween. That is, the PSD sensor calculates a distance to the obstacle using triangulation.

The PSD sensor includes a light emitting unit emitting infrared light to an obstacle and a light receiving unit receiving infrared light returned after being reflected from the obstacle. In general, the PSD sensor is formed as a module. In a case in which an obstacle is sensed by using the PSD sensor, a stable measurement value can be obtained regardless of difference in reflectivity or color of the obstacle.

The controller 1800 may measure an angle between an infrared light emitting signal irradiated by the cliff sensor toward the floor and a reflection signal received after being reflected from the obstacle to sense a cliff, and analyze a depth thereof.

Meanwhile, the controller 1800 may determine whether the moving robot may be able to pass through a cliff according to a floor state of the cliff sensed by using the cliff sensor. For example, the controller 1800 may determine whether a cliff is present and a depth of the cliff through the cliff sensor and only when a reflection signal is sensed by the cliff sensor, the controller 1800 allows the moving robot to pass through the cliff. In another example, the controller 1800 may determine whether the moving robot is lifted using the cliff sensor.

Meanwhile, the 2D camera sensor may be provided on one surface of the moving robot and obtain image information related to the surroundings of the main body during movement. An optical flow sensor may convert an image of the lower side input from an image sensor provided therein to generate a predetermined format of image data. The generated image data may be stored in the memory 1700.

Also, one or more light sources may be installed to be adjacent to the optical flow sensor. One or more light sources irradiate light to a predetermined region of the floor captured by the image sensor. Namely, in a case in which the moving robot moves a cleaning region along the floor, when the floor is smooth, a predetermined distance is maintained between the image sensor and the floor. On the other hand, in a case in which the moving robot moves on the floor which is uneven, the image sensor may become away from the floor by a predetermined distance or greater due to depressions and protrusions and an obstacle of the floor. In this case, the one or more light sources may be controlled by the controller 1800 such that an amount of irradiated light can be adjusted. The light sources may be a light emitting device, for example, a light emitting diode (LED), or the like, whose amount of light can be adjusted.

The controller 1800 may detect a position of the moving robot regardless of whether the moving robot slides by using the optical flow sensor. The controller 1800 may compare and analyze image data captured by the optical flow sensor over time to calculate a movement distance and a movement direction, and calculate a position of the moving robot on the basis of the calculated movement distance and the calculated movement direction. By using the image information regarding the lower side of the moving robot using the optical flow sensor, the controller 1800 may perform correction resistant to sliding with respect to a position of the moving robot calculated by other means.

The 3D camera sensor may be attached to one surface or a portion of the main body of the moving robot to generate 3D coordinate information related to the surrounding of the main body. That is, the 3D camera sensor may be a 3D depth camera calculating a distance between the moving robot and a target to be imaged In detail, the 3D camera sensor may capture a 2D image related to the surrounding of the main body, and generate a plurality of pieces of 3D coordinate information corresponding to the captured 2D image.

In an embodiment, the 3D camera sensor may be formed as a stereovision type sensor. That is, the 3D camera may have two or more cameras obtaining an existing 2D image to combine two or more images obtained from the two or more cameras to form 3D coordinate information.

In detail, the 3D camera sensor according to the embodiment may include a first pattern irradiation part irradiating light of a first pattern downwardly to a front side of the main body, a second pattern irradiation part irradiating light of a second pattern upwardly to the front side of the main body, and an image obtaining part obtaining an image of a front side of the main body. Accordingly, the image obtaining part may obtain an image of a region to which light of the first pattern and light of the second pattern are incident.

In another embodiment, the 3D camera sensor may include an infrared pattern emitting part irradiating an infrared pattern together with a single camera, and a distance between the 3D camera sensor and a target to be imaged (or an imaging target) may be measured by capturing a shape in which an infrared pattern irradiated from the infrared pattern emitting unit is projected to the imaging target. The 3D camera sensor may be an infrared type 3D camera sensor.

In another embodiment, the 3D camera sensor may have an light emitting unit emitting light together with a single camera, and a distance between the 3D camera sensor and an imaging target may be measured by receiving a partial amount of light emitted from the light emitting unit and reflected from the imaging target and analyzing the received light. Such a 3D camera sensor may be a time of flight (TOF) type 3D camera sensor.

In detail, the 3D camera sensor is configured to irradiate light in a form extending in at least one direction. In an example, the 3D camera sensor may have first and second lasers, and the first laser may irradiate linear light beams crossing each other, and the second laser may irradiate a single linear light beam. According to this, a lowermost laser is used to sense an obstacle on a floor part, an uppermost layer is used to sense an upper obstacle, and an intermediate laser between the lowermost layer and the uppermost layer is used to sense an obstacle of an intermediate part.

Figure 5:
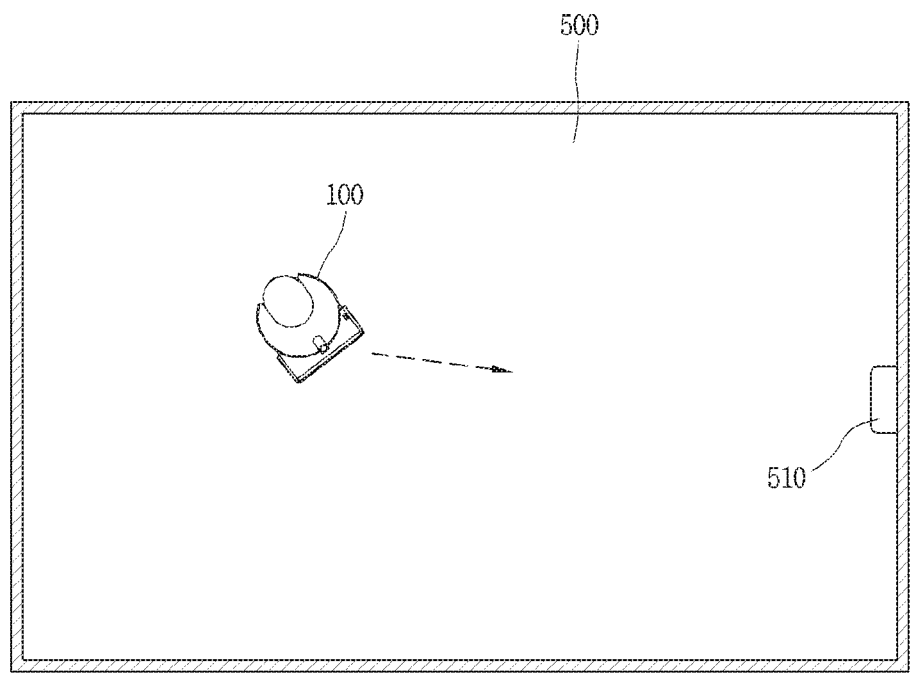
FIG. 5 is a conceptual view illustrating an example in which a cleaner and a charging station are installed in a cleaning area according to an embodiment of the present disclosure.

FIG. 5 illustrates an embodiment illustrating an installation of the cleaner 100 and a charging station 510 within a cleaning area 500. As illustrated in FIG. 5, a charging station 510 for charging a battery of the cleaner 100 may be installed within the cleaning area 500. In an embodiment, the charging station 510 may be installed on an outer portion of the cleaning area 500. Although not shown, the charging station 510 may have a communication device (not shown) capable of emitting different types of signal, and the communication device may perform wireless communication with the communication unit 1100 of the cleaner 100.

The controller 1800 may control the driving unit 1300 such that the main body of the cleaner 100 may be docked to the charging station 510 on the basis of a signal received by the communication unit 1100 from the charging station 510. When a remaining capacity of the battery is reduced to below a limit capacity, the controller 180 may move the main body toward the charging station 510, and when the main body approaches the charging station 510, the controller 1800 may control the driving unit 1300 to start a docking function.

Figure 6A:
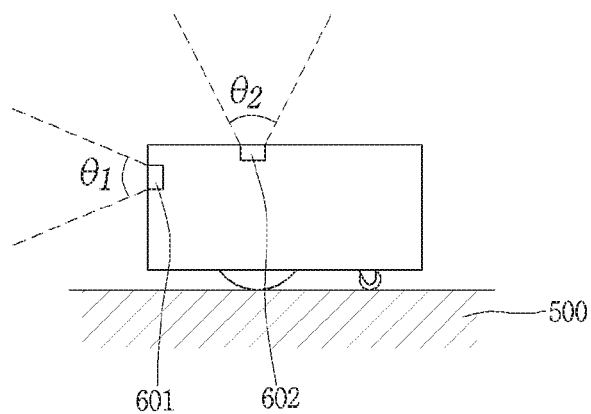
FIG. 6A is a conceptual view illustrating an example of a general cleaner separately including a front camera and a ceiling camera.

FIG. 6A illustrates an embodiment of a general cleaner separately including a front camera and a ceiling camera. Referring to FIG. 6A, the general cleaner may separately have a front camera 601 and a ceiling camera 602.

In general, an image captured by the front camera 610 is used to monitoring traveling of the cleaner. That is, a controller of the cleaner transmits an image captured by the front camera 601 to a user terminal or a server to allow a user to monitor an area in which the cleaner is present.

Also, an image captured by the ceiling camera 602 is used for simultaneous localization and mapping (SLAM) travel of the cleaner. That is, the controller of the cleaner may detect a position of the cleaner or generate cleaning map information using the image captured by the ceiling camera 602.

In this manner, the front camera 601 and the ceiling camera 602 are used for different purposes, and thus, a set value of the front camera and a set value of the ceiling camera may also be set to be different. For example, the front camera 601 used for monitoring traveling is required to transmit a clear image to the user, and thus, the front camera captures an image with relatively high intensity of collected illumination (or "exposure" corresponding to image plane illuminance times an exposure time). Meanwhile, the ceiling camera 602 used for SLAM traveling is required to enhance accuracy of detection of a position by avoiding glare, and thus, the ceiling camera 602 captures an image with relatively low intensity of illumination.

Thus, although the front camera 601 and the ceiling camera 602 have the same performance, the controller of the general cleaner may set an exposure time (or shutter speed) of the front camera 601 to be longer than an exposure time of the ceiling camera 602. In another examples, the controller may set an aperture and/or sensor sensitivity (ISO setting) of the front camera 601 to be greater than those of the ceiling camera 602 such that the front camera 601 collects relatively more light. In this manner, in the case of the general cleaner, since the cameras having different set values are used, both the front camera and the ceiling camera are required to normally perform monitoring traveling and SLAM traveling, and it is difficult to remove any one of them. Here, since two or more camera modules are required to be installed, manufacturing cost of the cleaner is increased.

Figure 6B:
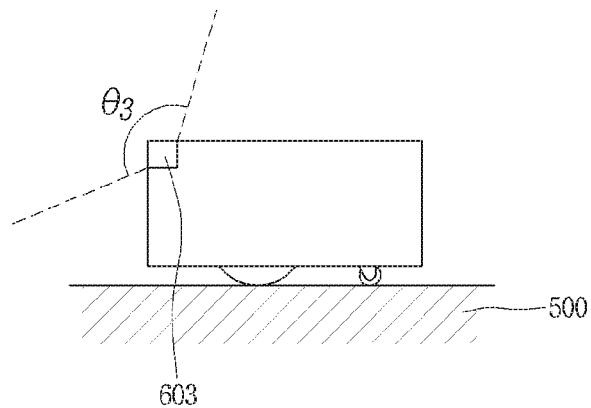
FIG. 6B is a conceptual view illustrating an embodiment of a cleaner using a single camera according to an embodiment of the present disclosure.

FIG. 6B illustrates an embodiment of the cleaner 100 according to the present disclosure. As illustrated in FIG. 6B, the cleaner 100 according to the present disclosure may normally perform both monitoring traveling and SLAM traveling using a single camera 603.

When FIGS. 6A and 6B are compared, an optical axis of the camera 603 of the cleaner 100 according to the present disclosure may form a predetermined angle with a floor surface of the cleaning area 500 in which the main body of the cleaner 100 is positioned. For example, an angle formed between a direction in which the camera 603 of the cleaner 100 according to the present disclosure is oriented and the floor surface ranges from 30° to 60°. Also, referring to FIG. 6B, a viewing angle of the camera 603 of the cleaner 100 according to the present disclosure may be equal to or greater than a predetermined angle. For example, a viewing angle of the camera 603 may range from 90° to 150°.

When FIGS. 6A and 6B are compared, a viewing angle 83 of the camera 603 may be larger than a viewing angle 81 of the front camera or a viewing angle 82 of the ceiling camera installed in the general cleaner. In this manner, compared with the general cleaner, although the number of cameras is reduced to one camera, since the wide-angle camera is used, an image related to a front side of the main body and an image related to the ceiling may be obtained at a time only by the single camera.

However, when the related art method for controlling a camera is applied to the cleaner 100 having only a single camera, it may not be appropriate for performing a plurality of traveling modes. Thus, hereinafter, a cleaner performing autonomous traveling, capable of obtaining an image having a set value required for a plurality of traveling modes of the cleaner 100 using a single camera, and a method for controlling the same will be described.

Meanwhile, although not shown in FIG. 6B, the camera 603 may be configured such that a direction in which the camera is oriented is changeable. A mechanical direction adjusting member (not shown) or an electronic direction adjusting member (not shown) may be provided in a part connecting the camera 603 and the main body, so that a direction in which the camera 603 is oriented may be changed.

Figure 7A:
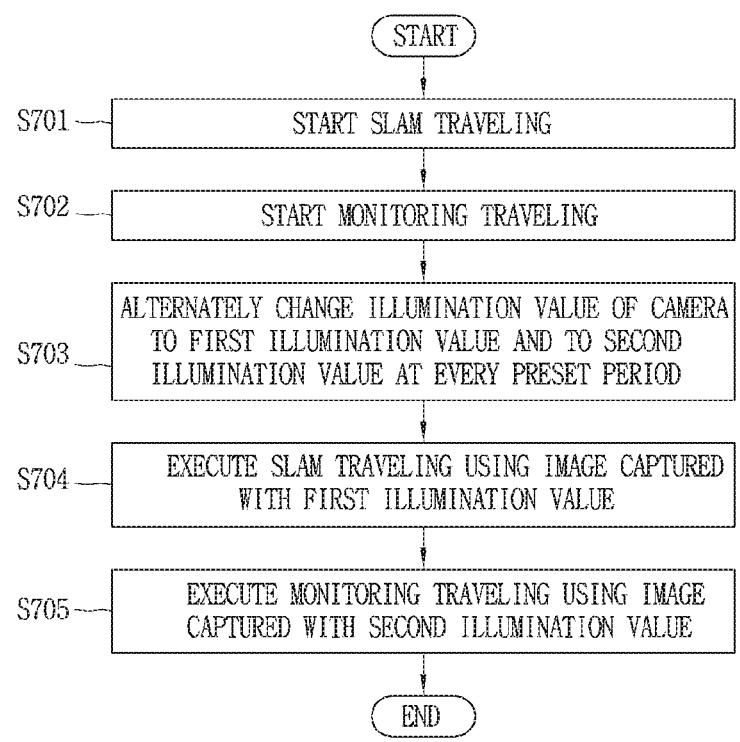
FIGS. 7A and 7B are flow chart illustrating a method for controlling a cleaner according to an embodiment of the present disclosure.
Figure 7B:
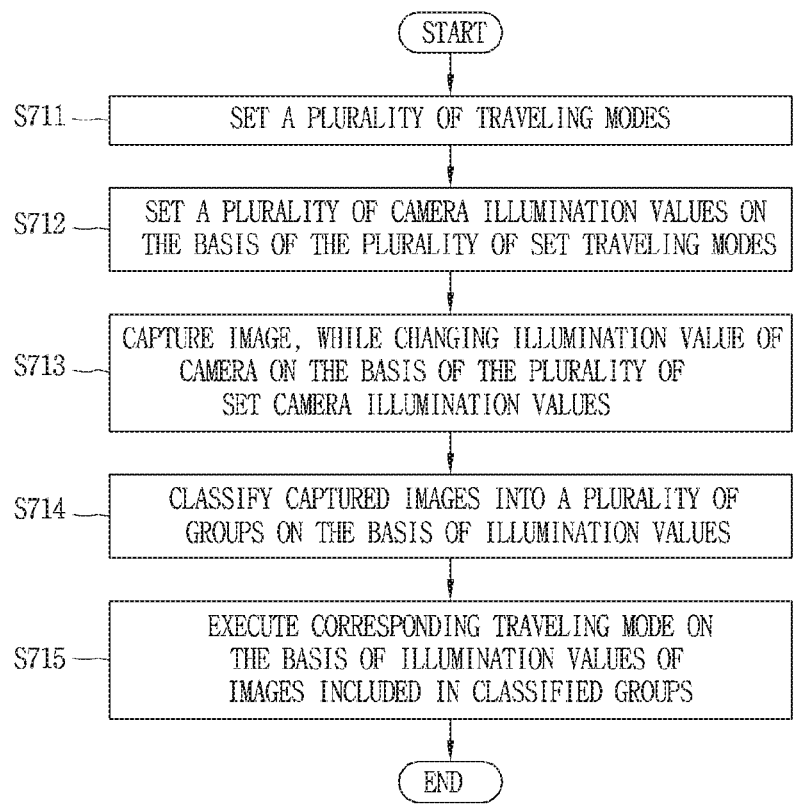

FIGS. 7A and 7B illustrate a method for controlling a cleaner according to the present disclosure. Referring to FIG. 7A, the controller 1800 may start SLAM traveling as a first traveling mode (S701). Also, the controller 1800 may start monitoring traveling as a second traveling mode (S702).

Meanwhile, in addition to the SLAM traveling and monitoring traveling, the controller 1800 may execute various traveling modes using an image captured by the camera. Hereinafter, however, for the purposes of description, the foregoing two traveling modes will be largely described.

The controller 1800 may alternately change an illumination value (or an illumination intensity value) of the camera to a first illumination value and to a second illumination value at every preset period or based on other factors (S703). In detail, when the camera starts to capture an image, the controller 1800 may set a set value related to illumination of the camera to the first illumination value, while a predetermined number of images are being captured. Thereafter, while a predetermined number of images are being captured, the controller 1800 may change a set value related to illumination of the camera to the second illumination value. The controller 1800 may repeatedly perform the process of changing the set value related to illumination of the camera.

Here, the set value related to illumination of the camera may include a set value related to an exposure time of the camera, a set value related to illumination output, and a set value related to a brightness filter. For example, when the first illumination value is applied, the number of images captured per unit time by the camera may be equal to or greater than the number of images required per unit time in the first traveling mode. For example, when the second illumination value is applied, the number of images captured per unit time by the camera may be equal to or greater than the number of images required per unit time in the second traveling mode.

Meanwhile, the first illumination and the second illumination are merely illustrative, rather than indicating that the controller 1800 according to the present disclosure selects any one of two set values related to illumination of the camera. That is, the controller 1800 may control the camera to capture a preset number of images with a plurality of different illuminations. Also, the controller 1800 may control the camera such that the number of images captured with any one of a plurality of illuminations is different from the number of images captured with another of the plurality of illuminations.

Also, the controller 1800 may perform any one of a plurality of traveling modes performed by the cleaner using an image captured with any one of the plurality of illuminations, and perform another of the plurality of traveling modes performed by the cleaner using an image captured with another of the plurality of illuminations. Here, the plurality of traveling modes may include at least one of an obstacle recognition mode, a monitoring traveling mode, and a position recognition mode.

In an embodiment, the controller 1800 may control the camera such that illumination of an image used to perform the position recognition mode is lower than illumination of an image used to perform at least one of the obstacle recognition mode and a monitoring mode.

The controller 1800 may execute SLAM traveling as the first traveling mode by using an image captured with the first illumination value (S704). In detail, the controller 1800 may detect a position of the cleaner 100 or generate a cleaning map related to the cleaning area 500 using the image captured with the first illumination value.

For example, the controller 1800 may extract a portion of the image captured with the first illumination value corresponding to the ceiling part, extract feature points from the extracted portion, and perform the first traveling mode using the extracted feature points.

The controller 1800 may execute monitoring traveling as the second traveling mode using the image captured with the second illumination value (S705). In detail, the controller 1800 may select a portion of the image captured with the second illumination value, and control the communication unit 1100 to transmit the selected image to at least one of a server and a user terminal.

Meanwhile, the image captured with the first illumination value may be an image captured to be darker than the image captured with the second illumination value. That is, the first illumination value may be lower than the second illumination value. Also, the number of images captured with the second illumination value may be larger than the number of images captured with the first illumination value.

Referring to FIG. 7B, the controller 1800 may set a plurality of traveling modes (S711). For example, the plurality of set traveling modes may include SLAM traveling and monitoring traveling.

The controller 1800 may set a plurality of camera illumination values on the basis of the plurality of set traveling modes (S712). In detail, the controller 1800 may detect information related to illumination of an image used in each of the plurality of set traveling modes. Also, the controller 1800 may set a plurality of camera illumination values such that images applicable in the plurality of traveling modes may be captured using the detected information related to illumination.

For example, in case where the plurality of traveling modes include a first traveling mode and a second traveling mode, the controller 1800 may detect information related to illumination of an image used in the first traveling mode and information related to illumination of an image used in the second traveling mode.

In this manner, the controller 1800 may set a first illumination value of the camera such that an image applicable to the first traveling mode may be captured using the information related to illumination of an image used in the first traveling mode. Similarly, the controller 1800 may set a second illumination value of the camera such that an image applicable to the second traveling mode may be captured using the information related to illumination of an image used in the second traveling mode.

The controller 1800 may control the camera to capture an image, while changing an illumination value of the camera, on the basis of a plurality of set camera illumination values (S713). In an embodiment, the controller 1800 may alternately change a set value related to illumination of the camera such that, after the camera captures an image in a state in which the first illumination value is set, the camera captures an image in a state in which the second illumination value is set.

In another embodiment, the controller 1800 may change a set value related to illumination of the camera such that, after the camera captures a first number of images in a state in which the first illumination value is set, the camera captures a second number of images in a state in which the second illumination value is set.

The controller 1800 may classify the captured images into a plurality of groups on the basis of illumination values (S714). In detail, the controller 1800 may classify an image captured in a state in which the first illumination value is set, to be included in a first image group used in the first traveling mode and an image captured in a state in which the second illumination value is set, to be included in a second image group.

The controller 1800 may execute a corresponding traveling mode on the basis of an illumination value of an image included in the classified group (S715). In detail, the controller 1800 may execute the first traveling mode using the image included in the first image group, and execute the second traveling mode using the image included in the second image group.

Figure 8A:
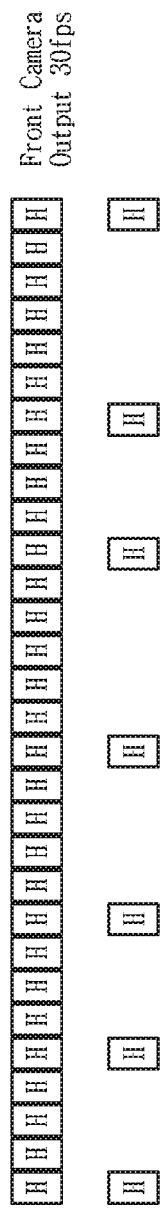
FIG. 8A is a conceptual view illustrating a method for processing a plurality of frames obtained from the front camera of the general cleaner illustrated in FIG. 6A.

FIG. 8A illustrates a method for processing a plurality of frames obtained from the front camera 601 of the general cleaner illustrated in FIG. 6A. The front camera 601 may capture a predetermined number of frames per second, and the controller of the general cleaner may select some of the frames captured by the front camera 601 and control the communication unit to transmit the selected frames to the server or the user terminal. Here, the controller of the general cleaner does not change an illumination gain of the front camera determining brightness of an image, and the front camera captures an image on the basis of a fixed illumination gain value.

Figure 8B:
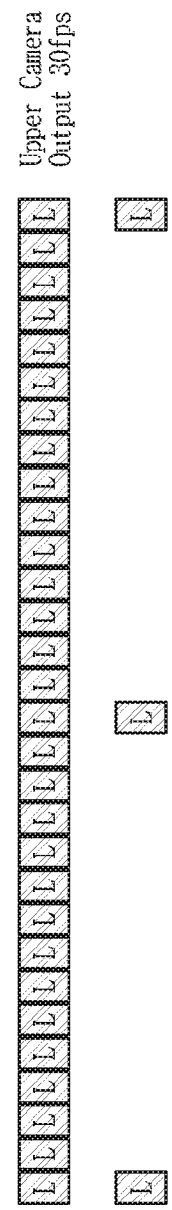
FIG. 8B is a conceptual view illustrating a method for processing a plurality of frames obtained from the ceiling camera of the general cleaner illustrated in FIG. 6A.

FIG. 8B illustrates a method for processing a plurality of frames obtained from the ceiling camera 602 of the general cleaner illustrated in FIG. 6A. The ceiling camera 602 may capture a predetermined number of frames per second, and the controller of the general cleaner may select some of the frames captured by the ceiling camera 602 and perform SLAM traveling using the selected frames.

Like the embodiment illustrated in FIG. 8A, the controller of the general cleaner does not change an illumination gain of the ceiling camera determining brightness of an image, and the ceiling camera captures an image on the basis of a fixed illumination gain value.

Figure 9A:
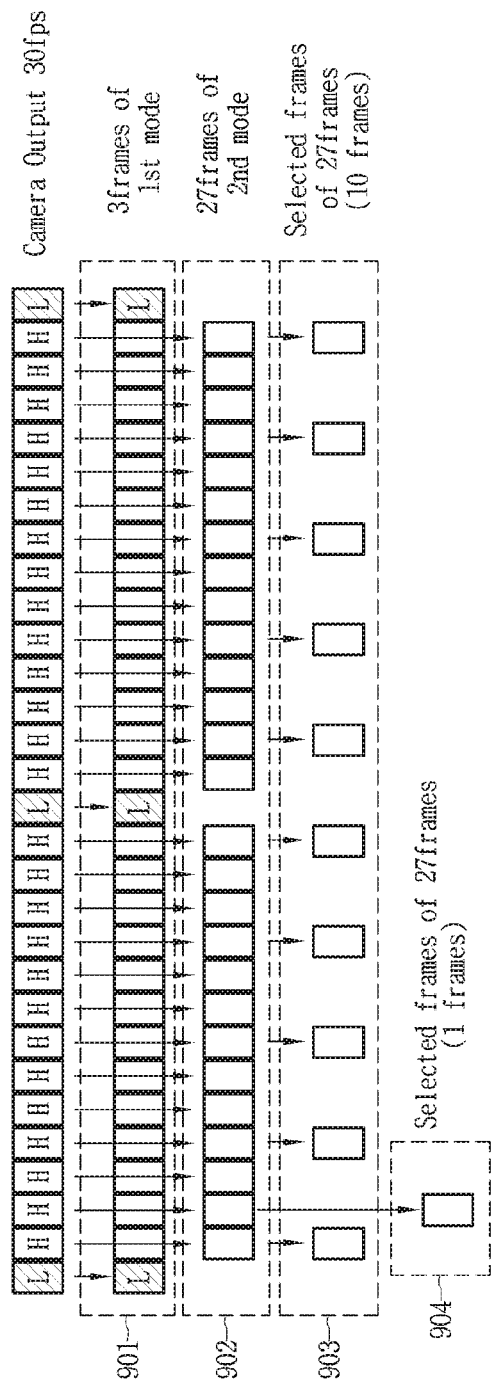
Figure 9C:
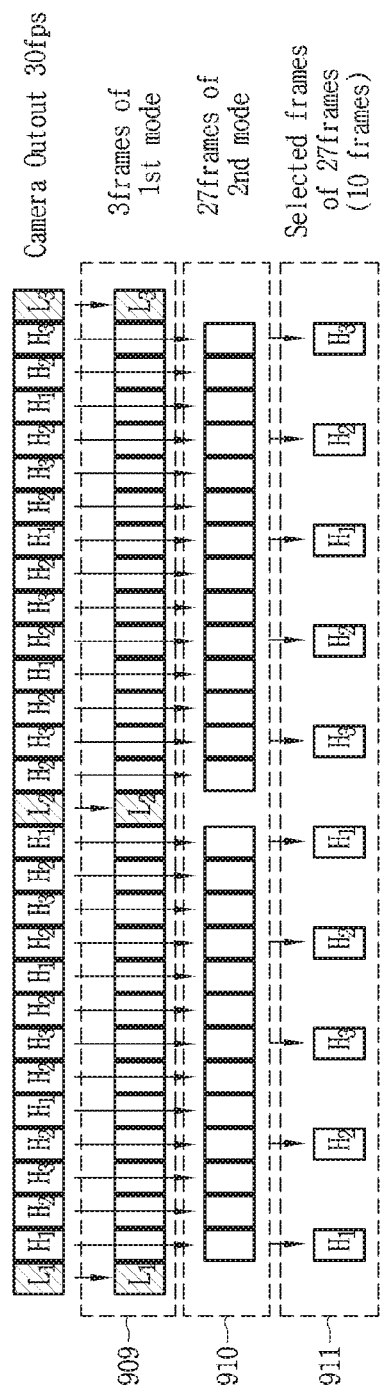

FIGS. 9A to 9C illustrate a method for processing a plurality of frames obtained from a single camera of a cleaner according to the present disclosure. Referring to FIG. 9A, the controller 1800 may change a set value related to illumination of the camera, while the camera is continuously imaging. In detail, referring to FIG. 9A, the single camera provided in the cleaner 100 according to the present disclosure may capture a preset number of images per second.

Here, the controller 1800 may control the camera to capture some of the preset number of images with a first (or low) illumination (L) and the other remaining images with a second (or high) illumination (H). For example, the camera provided in the cleaner 100 may capture 30 frames per second. Here, among images of the 30 frames, the controller 1800 may control the camera to capture images of three frames with the first illumination (L) and images of the other remaining 27 frames with the second illumination (H). In another example, the first illumination (L) may be set to be lower than the second illumination (H).

Meanwhile, when the first traveling mode and the second traveling mode are selected, the controller 1800 may detect information related to illumination of an image used in the first traveling mode and information related to illumination of an image used in the second traveling mode. That is, the controller 1800 may detect information related to brightness required in a traveling mode selected from among the plurality of traveling modes which can be executed by the cleaner 100.

For example, the controller 1800 may detect an illumination value of the camera for capturing an image used in the first traveling mode or the second traveling mode. In another example, the controller 1800 may detect an exposure time variable of the camera to capture an image used in the first traveling mode and the second traveling mode.

Also, when the first and second traveling modes are selected, the controller 1800 may detect the number of images used per unit time in the first traveling mode and the number of images used in the second traveling mode. That is, the controller 1800 may detect the number of images required in a traveling mode selected from among the plurality of traveling modes which can be executed by the cleaner 100. In detail, the controller 1800 may detect the number of images used per unit time in the first traveling mode as a first number, and detect the number of images used per unit time in the second traveling mode as a second number.

On the basis of the detected illumination value and the number of images, the controller 1800 may change the illumination value of the camera such that a predetermined number of images captured with the illumination values respectively required for the first traveling mode and the second traveling mode are included in a plurality of frames obtained by the single camera.

In detail, the controller 1800 may control the camera such that images captured with the first illumination (L) are included by a first number or greater in frames generated per unit time by the single camera and images captured with the second illumination (H) are included by a second number or greater in the frames generated per unit time by the single camera.

That is, when the first and second traveling modes are selected, the controller 1800 may control the camera such that a preset number of images obtained by the camera per unit includes the images captured with the first illumination (L) by the first number or greater and the images captured with the second illumination (H) by the second number or greater.

In addition, the controller 1800 may classify the images captured by the camera into a plurality of groups on the basis of illumination values of the images. The controller 1800 may perform labeling on each image on the basis of the classification result, and store the labeled images in the memory 1700.

After the images are classified, the controller 1800 may execute the first traveling mode among the traveling modes selected using the images captured with the first illumination. Also, after the images are classified, the controller 1800 may execute the second traveling mode among traveling modes selected using the images captured with the second illumination.

In an embodiment, the first traveling mode may be the SLAM traveling mode. Here, the controller 1800 may execute SLAM traveling by detecting information related to a position of the main body using the images captured with the first illumination. Also, the controller 1800 may generate map information of a cleaning area in which the main body is positioned using the images captured with the first illumination.

The image captured with the first illumination required for SLAM traveling may be an image with a relatively low illumination value. When SLAM traveling is performed, the controller 1800 may apply a relatively low illumination value to the camera to prevent glare within the image and enhance accuracy of SLAM traveling.

Meanwhile, in order to capture an image used in the first traveling mode, the controller 1800 may change a set value related to illumination of the camera within a first illumination range. That is, illumination of the image used in the first traveling mode may not be fixed to any one illumination value and the controller 1800 may control the camera such that a plurality of images used in the first traveling mode are captured with a plurality of illumination values, respectively. An embodiment in which a plurality of images used in the same traveling mode are captured with a plurality of illumination values, respectively, will be described in detail with reference to FIG. 9C.

In another embodiment, the second traveling mode may be a monitoring traveling mode. In detail, the controller 1800 may control the communication unit 1100 to transmit at least one of the images captured with the second illumination to the server or the user terminal.

Also, the controller 1800 may select a preset number of images among the images captured with the second illumination and control the communication unit to transmit the selected images to at least one of the server and the user terminal. The controller 1800 may determine sharpness of each of the images captured with the second illumination, select an image whose determined sharpness is equal to or greater than a preset sharpness value, and control the communication unit 1100 to transmit the selected image to at least one of the server and the user terminal.

The controller 1800 may select images corresponding to preset turns from among the images captured with the second illumination, and control the communication unit 1100 to transmit the selected image to at least one of the server and the user terminal. For example, the controller 1800 may select images corresponding to #1, #4, #7, #10, #13, #15, #18, #21, #24, and #27 from among the images captured with the second illumination.

Meanwhile, when a predetermined user input applied to at least one of the server and the user terminal is received through the communication unit 1100, the controller 1800 may increase or reduce the number of images transmitted to at least one of the server and the user terminal. Here, the controller 1800 may select an increased or reduced number of images from among the images captured with the second illumination, and control the communication unit 1100 to transmit the selected images to at least one of the server and the user terminal.

In this manner, the controller 1800 may change a set value related to illumination of the camera while the camera is continuously capturing images, such that images captured with mutually different illuminations are included in a plurality of frames captured by the single camera.

In the embodiment illustrated in FIG. 9A, the single camera provided in the cleaner 100 may generate 30 frames per second. In detail, the controller 1800 may control the camera to capture $1^{st}$, $15^{th}$, $30^{th}$ frames, among 30 frames, with the first illumination (L) and capture the other remaining 27 frames with the second illumination (H). According to such camera controlling, the cleaner 100 according to the present disclosure may obtain images captured with a plurality of illuminations using the single camera.

Also, referring to FIG. 9A, the controller 1800 may select some of the frames captured with the second illumination (H), and execute the second traveling mode using the selected frames. For example, a time interval between the selected frames may be uniform. That is, in selecting images used in the second traveling mode, the controller 1800 may select the images such that imaging timings between the images are uniform.

As illustrated in FIG. 9A, when the camera starts to capture a image, the controller 1800 may perform first illumination control to control the camera to capture a predetermined number of images with the first illumination (L). Also, when the first illumination control is completed, the controller 1800 may perform second illumination control to control the camera to capture a predetermined number of images with the second illumination.

In FIG. 9A, only 30 frames are illustrated but the controller 1800 may sequentially repeatedly perform the first illumination control and the second illumination control.

Referring to FIG. 9B, each time the camera generates a frame, the controller 1800 may alternately change a set value related to illumination of the camera to the first illumination (L) and to the second illumination (H). That is, the controller 1800 may control the camera such that images captured with the first illumination and images captured with the second illumination are sequentially repeatedly generated. In FIGS. 9A and 9B, a specific method for changing a set value related to illumination of the camera is illustrated, but the present disclosure is not limited thereto.

Meanwhile, referring to FIG. 9C, in order to capture an image used in the first traveling mode, the controller 1800 may change a set value related to illumination of the camera within the first illumination range. Also, in order to capture an image used in the second traveling mode, the controller 1800 may change the set value related to illumination of the camera within a second illumination range.

That is, illumination of an image used in any one traveling mode is not fixed to any one illumination value and the controller 1800 may control the camera to capture a plurality of images used in any one traveling mode to have a plurality of illumination values, respectively.

As illustrated in FIG. 9C, at a plurality of time points at which a plurality of images used in the first traveling mode are captured, the controller 1800 may set values related to illumination of the camera to a first set value L1, a second set value L2, and a third set value L3. Here, the first to third set values L1, L2, and L3 may be included in the first illumination range.

Also, as illustrated in FIG. 9C, at a plurality of time points at which a plurality of images used in the second traveling mode are captured, the controller 1800 may set values related to illumination of the camera to a fourth set value H1, a fifth set value H2, and a sixth set value H3. Here, the fourth to sixth set values H1, H2, and H3 may be included in the second illumination range.

In an embodiment, when the first traveling mode starts, the controller 1800 may set a set value related to illumination of the camera to the first set value L1 at a time point at which an image used in the first traveling mode is captured. Here, the first set value L1 may be a default value.

When the main body enters an area brighter than an area in which the first traveling mode started, while the first traveling mode is being performed, the controller 1800 may change the set value related to illumination of the camera to the second set value L2 at a time point at which an image used in the first traveling mode is captured.

Also, when the main body enters an area darker than the area in which the first traveling mode started, while the first traveling mode is being performed, the controller 1800 may change the set value related to illumination of the camera to the third set value L3 at a time point at which an image used in the first traveling mode is captured.

The controller 1800 may determine whether the main body enters an area darker than a previous area or an area brighter than the previous area using a sensing value from an illumination sensor (not shown) provided outside the main body. In this manner, the controller 1800 may change a set value related to illumination of the camera by frames such that images captured by the single camera may be used in each of the plurality of traveling modes.

In an embodiment, the controller 1800 may allocate frames generated by the single camera per unit time by selected traveling modes. That is, referring to FIG. 9C, the controller 1800 may allocate $1^{st}$, $15^{th}$, and $30^{th}$ frames to the first traveling mode, and the other 27 frame to the second traveling mode. Also, when brightness of an image used in the first traveling mode is changed while the first traveling mode is being performed, the controller 1800 may change a set value related to illumination of the camera at a time point corresponding to the frames allocated to the first traveling mode.

Figure 10:
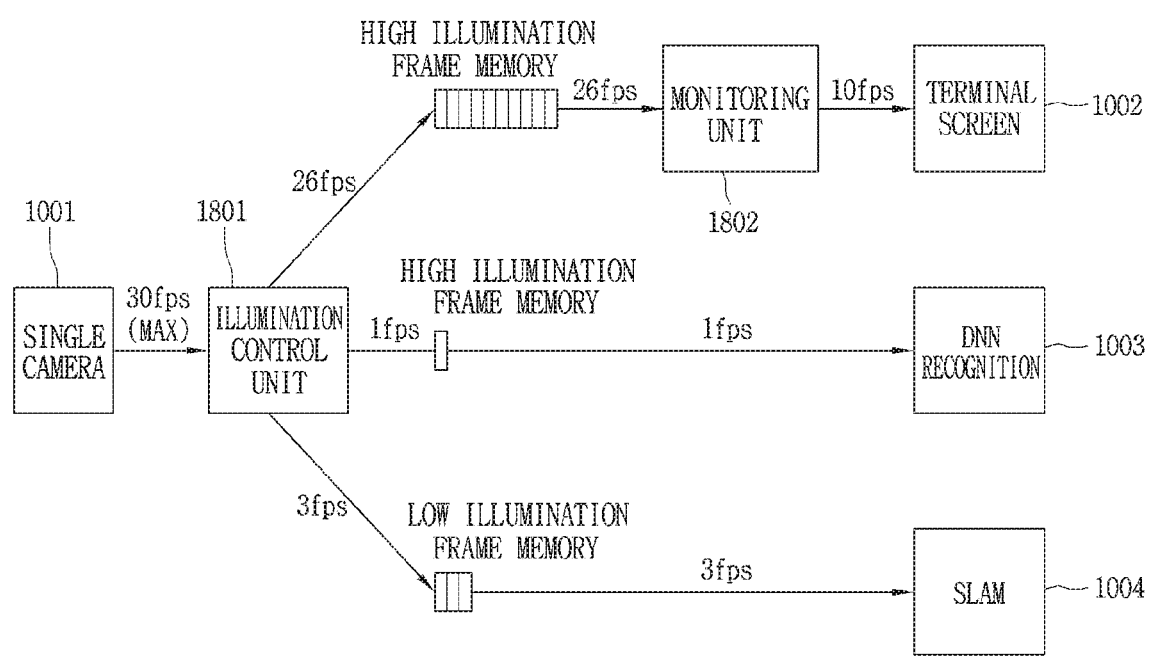
FIG. 10 is a block diagram illustrating a method for controlling a cleaner according to an embodiment of the present disclosure.

FIG. 10 illustrates a method for controlling the cleaner 100 according to the present disclosure. As illustrated in FIG. 10, a single camera 1001 of the present disclosure may capture images a maximum of 30 frames.

An illumination control unit (also referred to herein as an illumination control processor or illumination control circuity) 1801 included in the controller 1800 may change a set value related to illumination of the single camera 1001 while the single camera 1001 continuously performs imaging. Also, the illumination control unit 1801 included in the controller 1800 may group images captured with the same (or similar) illumination and store the images in the memory 1100 by groups.

Meanwhile, the illumination control unit 1801 included in the controller 1800 may distributedly allocate 30 frames captured per second to a plurality of traveling modes. The illumination control unit 1801 may group frames allocated to the same traveling mode and store the frames in the memory 1100 by groups. For example, the plurality of traveling modes may include a monitoring traveling mode 1002, a SLAM traveling mode 1004, and a deep learning recognition mode 1003.

Here, the illumination control unit 1801 may group 26 frames allocated to the monitoring traveling mode. Also, a monitoring unit 1802 included in the controller 1800 may transmit the 26 frames allocated to the monitoring traveling mode to the user terminal so that the 26 frames may be output on a terminal screen 1002.

Also, the illumination control unit 1801 may group three frames allocated to the SLAM traveling mode. The controller 1800 may execute SLAM traveling using the three frames allocated to the small traveling mode.

Also, the illumination control unit 1801 may allocate one frame to the deep learning traveling mode, and the controller 1800 may detect information related to a subject of the one frame allocated to the deep learning traveling mode by comparing the one frame allocated to the deep learning traveling mode and training data previously stored in the memory.

For example, the information related to the subject may include information related to whether the subject is an object or a living thing. In another example, the information related to the subject may include information related to species corresponding to the subject in case where the subject is a living thing. Also, in another example, the information related to the subject may include information related to a name of the subject in case where the subject is an object. In another example, the information related to the subject may include information related to a size and a shape of a subject. In another example, the information related to the subject may include information related to the number of objects including a frame allocated to the deep learning traveling mode.

According to the cleaner performing autonomous traveling according to the present disclosure, since a set value of the camera is changed as necessary, a plurality of traveling modes may be normally performed, while using only one camera. That is, according to the method for controlling a cleaner according to the present disclosure, the number of cameras installed in the main body is reduced, obtaining an effect of reducing manufacturing cost of the cleaner.

Also, according to the present disclosure, since an image having a set value required for the plurality of traveling modes using one camera, data throughput of the cleaner may be reduced. In addition, according to the present disclosure, since the plurality of traveling modes are performed using information obtained from one camera, efficiency of data processing may be increased.

Therefore, an aspect of the detailed description is to provide a cleaner performing autonomous traveling, capable of obtaining an image having a set value required for a plurality of traveling modes of the cleaner using only a single camera, and a method for controlling the same. Another aspect of the detailed description is to provide a cleaner performing autonomous traveling, capable of obtaining an image having a set value required for a traveling mode performed by the cleaner using only one camera, and a method for controlling the same.

Another aspect of the detailed description is to provide a cleaner performing autonomous traveling, capable of performing a plurality of traveling modes, while having only one camera, by changing a set value of the single camera according to an executed algorithm executed by a controller.

To achieve these and other aspect and in accordance with the specification, as embodied and broadly described herein, a cleaner performing autonomous traveling may include: a main body; a driving unit moving the main body; a camera capturing an image around the main body at every preset period; and a controller selecting at least one of a plurality of traveling modes and controlling the driving unit and the camera to perform the selected traveling mode, wherein the controller changes a set value related to illumination (i.e., intensity of illumination) of the camera while the camera is continuously capturing images.

The camera may capture a preset number of images per second, and the controller may control the camera to capture some of the preset number of images with first illumination and the other remaining images with second illumination. The camera may obtain images of 30 frames per second, the controller may control the camera to capture images of 30 frames among the 30 frames with first illumination and capture images of the other remaining 27 frames with second illumination, and the first illumination may be set to be lower than the second illumination.

When a first traveling mode and a second traveling mode are selected, the controller may detect information related illumination of an image used in the first traveling mode and information related to illumination of an image used in the second traveling mode. When the first traveling mode and the second traveling mode are selected, the controller may detect the number of images used per unit time in the first traveling mode and the number of images used in the second traveling mode.

When illumination of the image used in the first traveling mode is the first illumination, the number of images used per unit time in the first traveling mode is a first number, illumination of the image used in the second traveling mode is the second illumination, and the number of images used per unit time in the first traveling mode is a second number, if the first and second traveling modes are selected, while the camera is obtaining a preset number of images per second, the controller may control the camera such that a first or greater number of images captured with the first illumination is included in the obtained images and the second or greater number of images captured with the second illumination is included in the obtained images.

The controller may classify the images captured by the camera into a plurality of groups on the basis of illumination values of the images. The cleaner may further include: a memory storing the images captured by the camera, wherein the controller may perform labeling on the images on the basis of a classification result and stores the labeled images in the memory.

After the images are classified, the controller may execute the first traveling mode among traveling modes selected using the images captured with the first illumination and execute the second traveling mode among the traveling modes selected using the images captured with the second illumination.

The first traveling mode may be a simultaneous localization and mapping (SLAM) traveling mode, and the controller may execute the first traveling mode by detecting information related to a position of the main body using an image captured with the first illumination. The controller may generate map information of a cleaning area in which the main body is positioned using the images captured with the first illumination.

The cleaner may further include: a sensor sensing brightness of a cleaning area in which the main body is positioned, wherein the controller may determine whether brightness around the main body is changed on the basis of a sensing result from the sensor, and change an illumination value of the camera to correct an illumination value of the image used in the first traveling mode on the basis of a determination result.

The cleaner may further include: a communication unit performing communication with the outside, wherein the second traveling mode may be a monitoring traveling mode and the controller may control the communication unit to transmit at least one of images captured with the second illumination to a sever or a user terminal.

The controller may select a preset number of images among the images captured with the second illumination, and control the communication unit to transmit the selected image to at least one of the server and the user terminal. The controller may determine sharpness of each of the images captured with the second illumination, and select an image whose determined sharpness is equal to or greater than a preset sharpness value.

The controller may select images corresponding preset turns from among the images captured with the second illumination. When a predetermined user input applied to at least one of a server and a user terminal is received through the communication unit, the controller may increase or reduce the number of images transmitted to at least one of the server or the user terminal and select an increased or reduced number of images from among the images captured with the second illumination.

When imaging of the camera starts, the controller may perform first illumination control to control the camera to capture a predetermined number of images with the first illumination, and when the first illumination control is completed, the controller may perform second illumination control to control the camera to capture a predetermined number of images with the second illumination.

The controller may sequentially repeatedly perform the first illumination control and the second illumination control. An optical axis of the camera may form a predetermined angle with a floor surface of a cleaning area in which the main body is positioned. A viewing angle of the camera may be a predetermined angle or greater.

According to the cleaner performing autonomous traveling according to the present disclosure, since a set value of the camera is changed as necessary, a plurality of traveling modes may be normally performed, while using only one camera. That is, according to the method for controlling a cleaner according to the present disclosure, the number of cameras installed in the main body is reduced, obtaining an effect of reducing manufacturing cost of the cleaner.

Also, according to the present disclosure, since an image having a set value required for the plurality of traveling modes using one camera, data throughput of the cleaner may be reduced. In addition, according to the present disclosure, since the plurality of traveling modes are performed using information obtained from one camera, efficiency of data processing may be increased.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the scope of the disclosure will become apparent to those skilled in the art from the detailed description.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot comprising:
   a main body;
   a motor that selectively provides a driving force to move the main body;
   a camera that captures a plurality of images of a space around the main body; and
   a controller that selects between a plurality of traveling modes, and manages the motor and the camera based on selecting between the traveling modes,
   wherein the controller changes a setting of the camera related to illumination in the images based on selecting between the traveling modes while the camera is capturing the images, and
   wherein the camera captures a particular number of images per unit time, and the controller changes the setting of the camera such that the particular number of images are captured during the unit time with a plurality of different illuminations.

2. The robot of claim 1, wherein
   the controller changes the setting of the camera such that a first number of the images captured with one of the plurality of illuminations is different from a second number of images captured with another one of the plurality of illuminations.

3. The robot of claim 1, wherein
   the controller performs one of a plurality of traveling modes using one of the images captured with one of the plurality of illuminations, and performs another one of the plurality of traveling modes using another one of the images captured with another one of the plurality of illuminations.

4. The robot of claim 3, wherein
   the plurality of traveling modes include an obstacle recognition mode, a monitoring mode, and a position recognition mode.

5. The robot of claim 4, wherein
   the controller changes the setting of the camera such that illumination of a first image used to perform the position recognition mode is lower than illumination of a second image used to perform at least one of the obstacle recognition mode or the monitoring mode.

6. The robot of claim 1, wherein
the camera obtains images at 30 frames per second,
the controller changes the setting of the camera to capture 3 frames of the 30 frames with first illumination and capture another 27 frames of the 30 frames with second illumination, and
the first illumination is set to be lower than the second illumination.

7. The robot of claim 1, wherein
a first traveling mode and a second traveling mode are selected from the plurality of traveling modes,
first images of the plurality of images relate to the first traveling mode, and second images of the plurality of images relate to the second traveling mode, and
the controller detects information related to illumination of the first images used in the first traveling mode and information related to illumination of the second images used in the second traveling mode.

8. The robot of claim 7, wherein
when the first traveling mode and the second traveling mode are selected from the plurality of traveling modes, the controller detects a first number of images used per unit time in the first traveling mode and a second number of images used per unit time in the second traveling mode.

9. The robot of claim 8, wherein
the illumination of the first images used in the first traveling mode is a first illumination,
the illumination of the second images used in the second traveling mode is a second illumination, and
when the first and second traveling modes are selected and while the camera is obtaining a preset number of images per second, the controller controls the camera such that the preset number of images per second includes at least the first number of the first images captured with the first illumination and at least the second number of images captured with the second illumination.

10. The robot of claim 1, wherein
the controller classifies the images captured by the camera into a plurality of groups based on the different illuminations of the images.

11. The robot of claim 10, further comprising:
a memory that stores the images captured by the camera,
wherein the controller labels the images based on classifying the images into the plurality of groups and stores the labeled images in the memory.

12. The robot of claim 10, wherein
after the images are classified, the controller executes a first traveling mode selected from the traveling modes using a first group of the images captured with a first illumination associated with the first travel mode, and executes a second traveling mode selected from the traveling modes using a second group of the images captured with a second illumination associated with the second travel mode.

13. The robot of claim 12, wherein
the first traveling mode is a simultaneous localization and mapping (SLAM) traveling mode, and
the controller executes the first traveling mode based on detecting information related to a position of the main body using one of the first group of images captured with the first illumination.

14. The robot of claim 13, further comprising:
a sensor that senses a brightness of the space in which the main body is positioned,
wherein the controller determines, based on information collected by the sensor, a change in the brightness of the space, and changes the setting of the camera related to illumination of the first group of the images used in the first traveling mode to correct for the change in the brightness of the space.

15. The robot of claim 12, further comprising:
a communication interface that exchanges signals with another device that is external to the robot,
wherein
the second traveling mode includes a monitoring traveling mode, and
the controller directs the communication interface to transmit at least one of the second group of images captured with the second illumination to a server or a user terminal.

16. The robot of claim 15, wherein
the controller selects a quantity of images from the second group of the images captured with the second illumination, and directs the communication interface to transmit the selected quantity of images to at least one of the server or the user terminal.

17. The robot of claim 16, wherein
when information related to a user input applied to one or more of the server or the user terminal is received through the communication interface, the controller changes the quantity of images based on the user input, selects the change quantity of images from the second group of the images captured with the second illumination, and transmits the changed quantity of images to the at least one of the server or the user terminal via the communication interface.

18. The robot of claim 1, wherein
the controller, when changing the setting of the camera, performs first illumination control to cause the camera to capture a first number of images with a first illumination of the different illuminations, and
when the first illumination control is completed, the controller performs second illumination control to cause the camera to capture a second number of images with a second illumination of the different illuminations.

19. The robot of claim 18, wherein
the controller sequentially and repeatedly performs the first illumination control and the second illumination control.

20. The robot of claim 1, wherein the robot is an autonomous cleaner.

* * * * *